Patented July 11, 1939

2,165,721

UNITED STATES PATENT OFFICE 2,165,721

PROCESS OF MANUFACTURING OF A BLOOD PRODUCT

James L. Norman, Oakland, Calif.

No Drawing. Application October 23, 1937, Serial No. 170,650

2 Claims. (Cl. 99—21)

This invention relates to a process of preparation of a food product for preservation and distribution in a canned state from raw blood as received from slaughtered animals.

I have found that the heretofore canned blood products of this character have contained a substantial proportion of dehydrated and/or apparently scorched blood, which is substantially valueless for nutrition purposes. Whatever the cause may be for the existence of such portions in these blood products, it is my theory that dehydration and scorching are probably due to improper processing methods heretofore practiced. At any event, dehydrated and scorched blood are inferior in protein content to an extent actually, and often defined by law as, worthless. The process of my invention substantially avoids the formation of dehydrated and/or scorched portions in the resultant product. It is therefore an object in the process of my invention to produce a canned blood product which is substantially free from dehydrated and scorched blood and which product has relatively high protein content.

The process is preferably carried through in the following manner:

Firstly, blood as received from the slaughtered animal, is caused to coagulate, preferably by refrigerating the same for several days; secondly, the coagulated blood is ground or comminuted to a desired consistency, preferably approximating that of ordinary ground meat; thirdly, the resultant product of the second step is placed in mass formation as in a container or vat; fourthly, live steam is injected within the body of the mass so as to expose all particles thereof to its action. Such extensive exposure may be accomplished by injecting the steam at substantial velocity and in quantity sufficient to reach all particles or, by agitating the mass by mechanical means during ejection of the steam, or both. The application of steam is continued until the mass is raised to a temperature in the neighborhood of 212° F. Fifthly, the mass is, in its heated state, placed in cans with such other food elements, if any as are to be included and sealed therein; sixthly, the canned product is brought to such temperature necessary to comply with controlling food laws, which generally require exposure for a fixed length of time to some temperature in excess of 212° and less than 300° F., prior to disposition for marketing.

An alternative method of practicing this invention is to draw the blood from the animal into an agitating vat and while it is still warm subject it to agitation by any suitable means. This treatment prevents the formation of the blood coagulum. After such agitation live steam is injected into the mass, agitation thereof being continued so as to expose all particles to the steam and to raise the temperature thereof to approximately 212° F. The resultant mass assumes a consistency similar to grated cheese. The mass is then sealed in cans as in the fifth step of the alternative process, and, as so conditioned, is subjected to such further temperature treatment as demanded by said controlling law.

The product when removed from the can is found to be free of material quantities of dehydrated or scorched blood and has a protein content approaching near an optimum which in the case of normal raw blood is about 14%.

Having described my invention, I claim:

1. The process of preparing fresh animal blood for consumption that comprises the steps of allowing the fresh blood from a slaughtered animal to stand in a quiescent state until coagulated, then reducing the coagulated blood into relatively small substantially uniform sized pieces and thereafter injecting live steam into a mass of said pieces of blood until the temperature of the mass is raised to about 212° F.

2. The process of preparing fresh animal blood for consumption that comprises the steps of cooling the fresh blood from a slaughtered animal in a quiescent state until coagulated, thereafter mechanically reducing the coagulated blood into relatively small substantially uniform sized pieces and thereafter injecting live steam into a mass of said pieces until the temperature of the mass is raised to about 212° F.

JAMES L. NORMAN.